Figure 1:
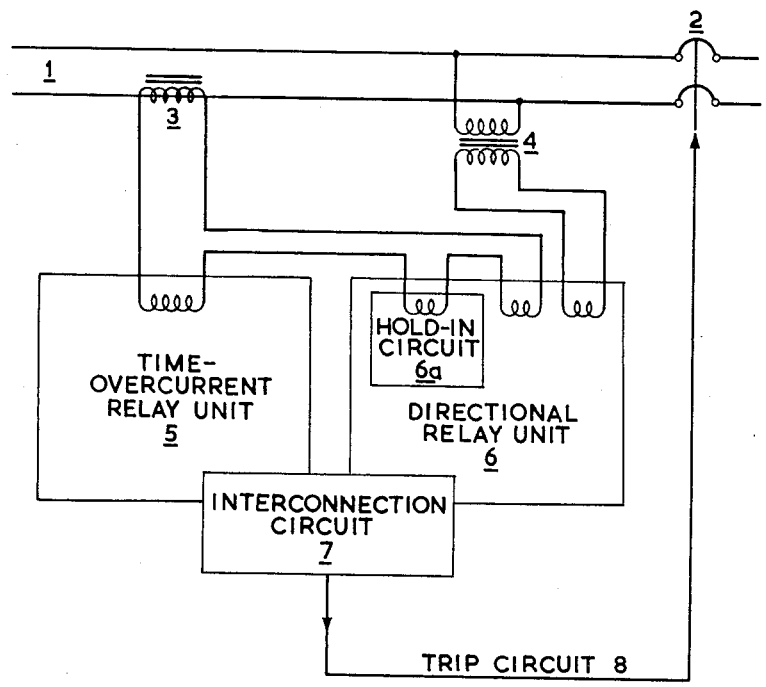

May 23, 1961   A. R. VAN CORTLANDT WARRINGTON   2,985,801
ELECTRICAL TIME-OVERCURRENT PROTECTIVE RELAYS
Filed Nov. 21, 1957                                     2 Sheets-Sheet 1

Inventor:
Albert Russell van Cortlandt Warrington
By:
Stevens, Davis, Miller & Mosher
Attorneys ary be of the induction type. They may, for example, involve static units such as transistorized relays.

United States Patent Office 2,985,801
Patented May 23, 1961

2,985,801
ELECTRICAL TIME-OVERCURRENT PROTECTIVE RELAYS

Albert Russell van Cortlandt Warrington, Stafford, England, assignor to The English Electric Company, Limited, London, England, a British company Filed Nov. 21, 1957, Ser. No. 697,977

Claims priority, application Great Britain Dec. 21, 1956

5 Claims. (Cl. 317—36)

This invention relates to electrical protective relays having time-overcurrent operating characteristics.

It is an object of this invention to provide a new and improved time-overcurrent relay device having a directional characteristic and capable of operation on close-in faults.

Where relays are required to protect against faults on a protected line at a position close to the relay location it is possible to provide the relay with what has become known as a "memory action." Such a memory action usually takes the form of a tuned circuit which is incorporated in the voltage energization circuit of the relay and is able to store sufficient energy to provide a representative voltage signal even though a close-in line fault gives rise to a severe reduction in the normal voltage signal. There has been little difficulty in the past in applying such a form of memory action in instantaneous operating relay systems. However, a problem arises where the operation of a slow-acting time-overcurrent relay unit has to be conditioned by some auxiliary relay device which responds to a voltage condition on the line. Thus, in a situation in which an auxiliary directional relay unit is used to condition the operation of the main time-overcurrent relay unit, it may frequently happen that the required operating time of the time-overcurrent unit will exceed the duration of the memory action incorporated in the directional unit. This invention is concerned with the improvement of such relay arrangements to extend the effect of memory action and so enable a directional time-overcurrent relay device to be used reliably to protect against close-in faults which lead to a loss of voltage signal.

According to one aspect of the invention an electrical protective relay device comprises, in combination, a time-overcurrent induction relay having an armature restrained by magnetic damping means, an auxiliary directional induction relay having a voltage signal energy store for memory action, circuit connections between the relays operative to ensure that the device as a whole will only operate when both of said relays are in an operative state simultaneously, and hold-in means energized by the operating overcurrent signal of said time-overcurrent induction relay and operative to prolong the effect of said memory action by retaining the directional relay in the operative state as long as the over-current condition prevails.

According to a feature of the invention, said circuit connections between the relays comprise an electrical circuit including a phase-shifting shading winding on an operating magnet of said time-overcurrent relay and contact means forming a switch in said circuit and operative to close said electrical circuit when the directional relay is operated.

Other features of the invention relate to the provision of a voltage polarization in the directional relay and relay systems which utilize relay devices according to the aspect of the invention just described. In such systems it is to be understood that the relays used need not necesIn order that the invention may be well understood and readily carried into effect it will now be described with reference to the accompanying drawings, in which Fig. 1 shows a protective relay system embodying the invention in its broadest sense, and Fig. 2 shows a directional time-overcurrent relay device embodying various features of the invention.

Figure 2:
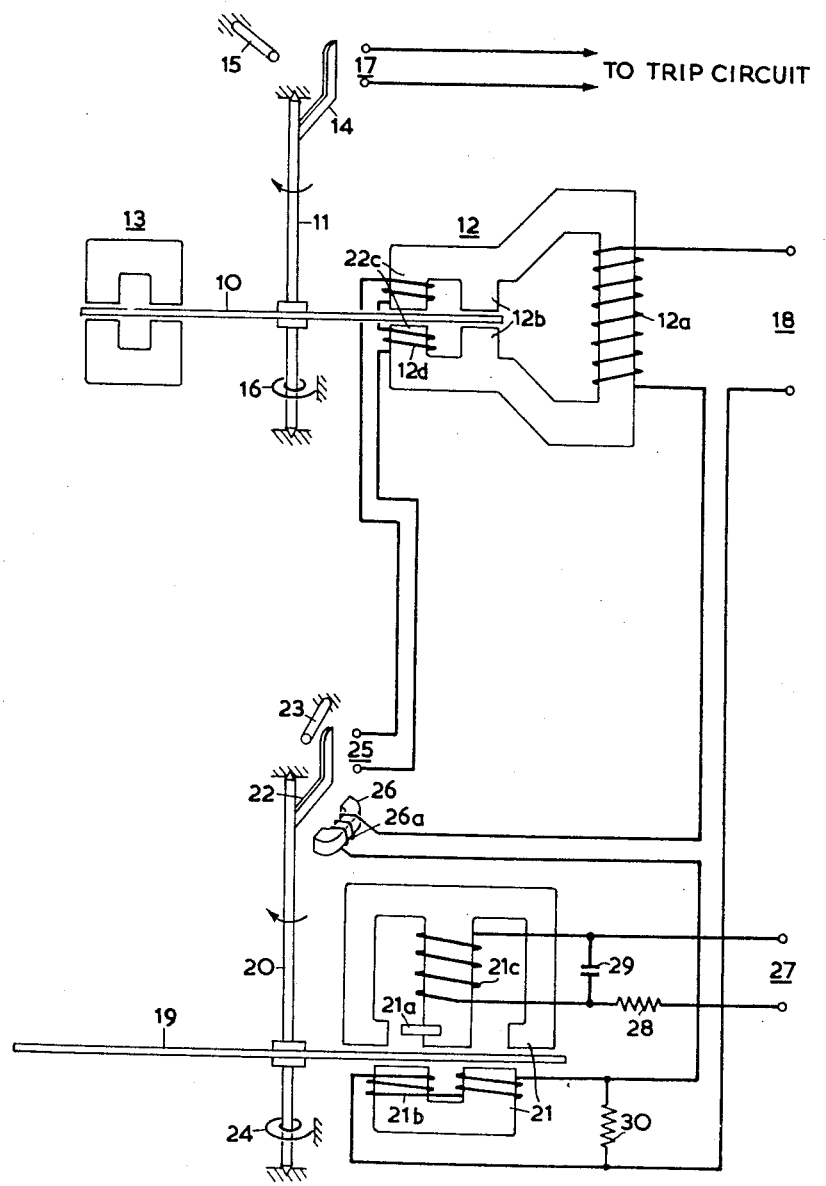

Referring to Fig. 1 a protective relay system embodying the invention is shown schematically to comprise a single-phase protected line 1 including a circuit interrupter 2 and energizing a current transformer 3 and a voltage transformer 4. The relay system further comprises two relay units, one of which is a time-overcurrent relay unit 5 and the other of which is a directional relay unit 6. The two units are interconnected by a circuit 7 which has been denoted in the drawing an "interconnection" circuit. The function of this circuit is to provide some connection between the relay unit 5 and the relay unit 6 by which the operation of the relay unit 5 to energize a trip circuit 8 is conditioned by the operation of the unit 6. One typical form of interconnection circuit known in the art consists merely in a direct series connection of relay-operated contacts of the two unit 5 and 6. With such an arrangement the trip circuit 8 is only energized when the contacts of both units are closed. The effect of the time-overcurrent relay unit 5 in controlling a tripping action of the interrupter 2 is therefore dependent upon the appropriate detection of the directional character of a fault on the line 1 by the unit 6. To obtain an appropriate operation of the units 5 and 6, unit 5 is shown to be energized by a signal proportional to the current in the protected line 1 as derived from the transformer 3. This current signal is also supplied to a hold-in circuit 6a which forms a part of the directional relay unit 6. In addition to this the unit 6 is energized in accordance with a current signal derived from the transformer 3 and a voltage signal derived from a transformer 4, the application of these control signals in a manner necessary to endow the unit 6 with a directional sensing function being well understood by those skilled in the appropriate art. The function of the hold-in circuit will be understood by reference to the following description of the operation of the system shown in Fig. 1 of the accompanying drawings.

For normal line currents there is no tendency for the relay unit 5 to operate to produce a tripping signal. The operation or non-operation of the relay unit 6 is therefore of no consequence until such time as a fault condition exists on the line 1 which causes the current carried by this line to become excessive. When this occurs the relay unit 5 is set in operation and after the lapse of a time determined by the magnitude of the over-current the unit 5 will endeavour to energize trip circuit 8 provided this is permitted by unit 6. If the power supplied along the line 1 is fed in the appropriate direction to the fault then relay unit 6 will allow unit 5 to trip the circuit interrupter 2 and so perform a full protection function. However, it is essential for correct operation that the unit 6 has the inherent capacity to provide a correct directional detection of the power supplied along line 1 to the fault for a period at least as long as the operating time of the unit 5. By virtue of the inherent time delay introduced by the operation of the unit 5 this requirement imposes on the unit 6 the need for a prolonged memory action if the relay system is to work correctly when short circuit faults occur on the line close to the relay. Such faults lead to a loss of voltage signal which can deprive a simple directional relay unit of its capacity to indicate correctly. The provision of a conventional form of memory action involving the tuned circuit as part of the voltage energization circuit of the unit 6 is inadequate, as memory action of this kind is only sustained for a few cycles, whereas the operating time of the time-overcurrent unit may be measured in terms of seconds. To remedy this difficulty this invention provides a special hold-in circuit 6a which operates in conjunction with relay unit 6 to retain a detection afforded by the unit for a period determined by the duration of an over-load condition. Thus upon the incidence of a close-in fault on the line 1, the inherent memory action of the unit 6 will result in a correct directional indication by this unit for a period of, say, two cycles. Also, when the fault occurs the overcurrent will lead to an energization of the hold-in circuit 6a and this circuit is of such a nature as to retain the contact setting of the unit 6 in the position established during its memory action period and for as long as the over-current condition on the line exists. In this way a correct directional indication is afforded by the unit 6 and, after the lapse of the time delay governed by the time-overcurrent unit 5, the trip circuit 8 will become energized to operate interrupter 2 and so de-energize the line 1. This de-energization will remove the over-current condition energizing the hold-in circuit 6a and the relay unit 6 will then be allowed to reset.

Whereas in Fig. 1 the output signal used to energize the trip circuit 8 is shown to be derived from an interconnection circuit 7 it is to be understood that a suitable inter-connection can be established between the units 5 and 6 without the circuit 7 supplying directly the trip circuit 8. This will be evident from the description of a typical relay suitable for use in a system of the kind just described.

Refer now to Fig. 2, which shows a directional time-overcurrent relay device which comprises a time-overcurrent unit shown in the upper part of the figure and a directional unit shown in the lower part of the figure. Both units have induction discs with shaded pole induction motor drives.

The time-overcurrent unit comprises a disc armature 10 supported by a pivotally mounted spindle 11 and arranged to move between the poles of an operating magnet 12 and between the poles of a permanent magnet 13. The spindle 11 carries an arm 14 which is normally held against a fixed stop 15 by the action of a spring 16, but which is moved into contact with two tripping contacts 17 when sufficient electromagnetic force to overcome the bias of the spring is applied by the operating magnet 12 to the armature 10. In this latter event, the arm 14, which is conductive, bridges the two contacts 17 to close a circuit and promote a tripping action of a switch in a protected circuit. The operating magnet 12 has an energizing winding 12a which is connected to relay terminals 18. The magnet has also a pair of shaded poles 12b and a pair of poles 12c that are shaded by means of a shading winding 12d. The arrangement is such that when the winding 12a is energized by alternating current and the winding 12d is operative an electromagnetic force is imparted to the armature 10 tending to move the arm 14 in the contact closing direction as indicated by the arrow.

As so far described, there is nothing new about the time-overcurrent unit. When the terminals 18 are connected to an external circuit so as to be supplied by a signal representing the current flowing in the circuit protected a force determined by this current urges the armature to move in the tripping direction. The spring 16 is designed so that its restraint does not change very much as the arm 14 moves from rest, the position in which it is held against the stop 15, to the tripping position, the position in which it bridges the contacts 17. Thus, once the current is strong enough to overcome the spring bias and cause the armature to move, a condition which is usually accompanied by a sudden rise of current, the spring has but little effect in restraining relay operation. A time-delay feature is provided by the action of the permanent magnet 13.

When it is required to endow a time-overcurrent relay with a directional feature, by which it only responds to power flow in a particular direction along a protected line, the characteristics of the necessary directional unit become superimposed, to some extent, upon the basic time-overcurrent characteristic and this leads to slight inaccuracies and adverse performance under certain fault conditions. These difficulties can be remedied by resorting to a design utilizing an induction cup instead of a disc but this involves additional expense. By applying the present invention the directional and time-overcurrent functions are separated; the induction disc form of armature may be retained; and the resulting relay is found to have certain advantages both over existing induction disc directional time-overcurrent relays and over such relays of induction cup design.

Referring again to Fig. 2, it is seen that the time-overcurrent unit differs from its truly conventional form in that the winding 12a is not connected directly to the terminals 18 but passes through circuit elements of the independent directional unit shown in the lower part of the figure. Also, the shading winding 12d is connected to a pair of contacts which may or may not be connected to short-circuit the winding, the connection depending upon the directional unit.

This unit comprises a disc armature 19 supported by a pivotally mounted spindle 20 and arranged to move between the poles of a magnet 21. The spindle 20 carries an arm 22 which is normally held against a fixed stop 23 by the action of a spring 24, but which is moved into contact with two contacts 25 when sufficient force in the appropriate direction (that shown by the arrow) is applied to the armature by the electromagnetic action of the magnet 21. In this latter event, the arm 22, which is conductive, bridges the two contacts 25, and, since these contacts are connected to the shading winding 12d of the time-overcurrent unit, this winding is then short-circuited and the operating magnet 12 rendered operative. Besides being conductive, the arm 22 has also a ferromagnetic character and is adapted, when brought into engagement with the contacts 25, to be retained in this position by a holding magnet 26 if this magnet is sufficiently energized. The magnet 26 has an energizing winding 26a which is one of the circuit elements already referred to as connected in the circuit of the winding 12a and the terminals 18. The magnet 21 has a conventional form and is provided with a shading loop 21a, a current winding 21b and a voltage winding 21c, the winding 21b forming another element connected in series with the winding 12a, and the winding 21c being connected to relay terminals 27. A resistor 28 is connected in series with the winding 21c and a capacitor 29 is connected directly in parallel with the winding 21c. Where required a phase-shifting resistor 30 may be connected in parallel with winding 21b.

When the terminals 27 are connected to the external circuit already mentioned, so as to be supplied by a signal representing a voltage in the protected circuit the magnet 21 becomes energized in response to both voltage and current, the latter being supplied through the terminals 18. Depending upon the relative sense of the phase difference between the signals supplied to the terminals 18 and 27 the magnet 21 acts to urge the armature 19 clockwise or anticlockwise. It is supposed that the relay is required to operate only when the phase difference promotes armature movement in the direction indicated by the arrow. Otherwise the armature is held at rest by the engagement of the stop 23 by the arm 22.

Thus when, in operation, the magnet 21 becomes sufficiently energized in response to signals having the appropriate directional character, the movement of the armature 19 brings the arm 22 into engagement with the contacts 25. This initiates the operation of the time-overcurrent unit by short-circuiting the shading winding 12d.

If the relay protects a power line and a fault occurs on the line close to the relay, the voltage signal available for operating the relay may be so weak that the relay may fail to operate. In high speed relays the provision of a resonant circuit tuned to the supply frequency and forming part of the voltage circuit of the relay system has, in the past, been used to provide the necessary operating power to cope with such close-in faults. This form of energy storage is not suitable for use in a conventional time-overcurrent relay, where the speed of operation is relatively low. However, the form of relay afforded by this invention lends itself to the use of a voltage memory device of the form just described. This is shown in Fig. 2 as the capacitor 29, which is tuned with the winding 21c to resonate at the supply frequency. The function of the resistor 28 is to prevent the energy stored in this resonant circuit from flowing from the relay in the event of a loss of voltage signal at the terminals 27. Instead, the energy is dissipated in the winding 21c and may, if the fault has the appropriate directional sense, be applied to operate the relay. The directional unit has a high speed character and operates to connect the terminals 25 before the power supplied by the resonant circuit falls to zero. The arm 22 is held in engagement with the contacts 25 by the action of the holding magnet 26. This magnet is energized in response to the current signal supplied to the terminals 18. Thus, if the current signal is sufficiently strong the magnet will prevent the resetting of the directional unit. The holding magnet retains the time-overcurrent unit operative in spite of a loss of the voltage signal at the terminals 27. When the time-overcurrent unit has operated to perform the protective action and so reduce the current signal to zero the holding magnet becomes de-energized and releases the arm 22, thus allowing the directional unit to reset owing to the action of the spring 24.

Whereas in the arrangement shown in Fig. 2 the stop 23 is located behind the contact arm 22 it may be preferable to locate the stop so that it engages a projection from the disc 19 close to the magnet 21. This eliminates the tendency of rebound action caused during resetting by resilience in the system, particularly the torsional resilience of the spindle 20.

Also, the spring 24 may be replaced with advantage by a permanent magnet behind (in the sense that the contacts 25 are in front of) the arm 22, this arm having a magnetic character and being attracted to the permanent magnet. Such a system has bistable features and prevents the arm 22 from floating between the stop 23 and the contacts 25 as it may do if the relay operating conditions are critical.

The shading loop 21a performs a function which is particularly advantageous in the relay device shown in Fig. 2. The purpose of this shading loop on the voltage energized section of the magnet 21 is to provide a force on the armature 19 in the contact opening direction. This force is a relay restraining force and is proportional to the square of the voltage signal applied to the terminals at 27. The setting of the directional unit as determined by the effect of this shading loop is such as to cause this voltage restraining signal to be sufficient to prevent relay operation for current signals up to full load. It is only when the overcurrent condition exists that the directional unit can operate to close the contacts 25 and become subject to the hold-in influence of the magnet 26. The presence of the shading loop 21a gives the directional unit a mho characteristic. On an impedance diagram this characteristic is a mho circle of large diameter. Its effect is not only to limit the operation of the relay device in the same way as a mho relay but also to prevent the directional unit from having its contacts closed when a fault suddenly occurs which causes a reversal of the power flow in a protected line. Thus, for example, if the device is used to protect a feeder supplied from a power station busbar system and a fault occurs on an adjacent feeder also supplied by the same busbar system, a sudden reversal of the direction of the power flow in the first feeder may, in the absence of the loop 21a, lead to a build up of the current energization of the magnet 26 before the directional unit has had time to assert itself and move the arm 22 from the sphere of influence of the magnet 26. This would lead to faulty operation of the relay and to safeguard against this possibility the directional unit includes the voltage polarization feature by which the arm 22 is kept away from the magnet 26 even though the direction of the power supplied along a feeder protected by the relay device is the appropriate direction for relay operation. This is the function of the shading loop 21a. It is only when the over-current condition exists at the same time that the relay operating directional condition is satisfied that the voltage restraining effect caused by the shading loop 21a is overcome by the basic inductive action of the directional unit that the arm 22 is brought adjacent the magnet 26 to close the contacts 25.

What I claim as my invention and desire to secure by Letters Patent, is:

1. An electrical protective relay device comprising, in combination, a time-overcurrent induction relay having an armature restrained by magnetic damping means, an auxiliary directional induction relay having a voltage signal energy store for memory action, circuit connections between the relays operative to ensure that the device as a whole will only operate when both of said relays are in an operative state simultaneously, and magnetic hold-in means energized by the operating overcurrent signal of said time-overcurrent induction relay and operative to prolong the effect of said memory action by retaining the directional relay in the operative state as long as the over-current condition prevails.

2. A relay device according to claim 1, wherein said circuit connections between the relays comprise an electrical circuit including a phase-shifting shading winding on an operating magnet of said time-overcurrent relay and contact means forming a switch in said circuit and operative to close said electrical circuit when the directional relay is operated.

3. A relay device according to claim 1, wherein said directional induction relay has armature operating and restraining magnet means which render the device operation-sensitive to an over-current condition in the operating direction of the directional relay and independently of said hold-in means.

4. A relay device according to claim 3, wherein said armature operating and restraining magnet means of the directional relay comprise a symmetrical magnet structure adapted to co-operate with an armature to move it in a direction determined by the phase difference between current and voltage energizing signals applied to energize the magnetic structure, but including a shading element which is operative to impose a voltage signal restraint on the armature in the relay operating direction whereby to polarize the relay to cause it to be in the inoperative state save when an over-current condition exists in the appropriate directional sense.

5. An electrical protective relay system comprising, in combination, a protected power line, voltage and current transformers connected to be energized in accordance with voltage and current conditions respectively of the protected line, a time-overcurrent induction relay unit having an armature restrained by magnetic damping means, an auxiliary directional relay unit, means for rendering the operation of the system following the operation of the time-overcurrent relay unit conditional upon a detection afforded by the directional relay unit, a magnetic holding means energized by the operating overcurrent signal of said time-overcurrent induction relay unit and operative to hold the directional relay unit in an operative condition for the duration of said over-current condition whereby to safeguard against loss of voltage signal due to faults on the line close to the relay.

References Cited in the file of this patent

UNITED STATES PATENTS

| | | |
|---|---|---|
| 1,792,271 | Breisky | Feb. 10, 1931 |
| 1,873,950 | Winter | Aug. 30, 1932 |
| 2,432,328 | Morris | Dec. 9, 1947 |
| 2,797,369 | Cordray | June 25, 1957 |

FOREIGN PATENTS

| | | |
|---|---|---|
| 425,121 | Germany | Jan. 5, 1923 |
| 390,280 | Germany | Feb. 16, 1924 |
| 268,532 | Great Britain | Apr. 7, 1927 |